United States Patent [19]

Fowler et al.

[11] 4,006,298
[45] Feb. 1, 1977

[54] BISTABLE MATRIX TELEVISION DISPLAY SYSTEM

[75] Inventors: Vernon John Fowler, Billerica; Bruce Conrad Anderson, Tewksbury, both of Mass.

[73] Assignee: GTE Laboratories Incorporated, Waltham, Mass.

[22] Filed: May 20, 1975

[21] Appl. No.: 579,172

[52] U.S. Cl. .................. 358/240; 315/169 TV; 340/324 M
[51] Int. Cl.² ........................................ H04N 5/66
[58] Field of Search .............. 178/7.3 D, 7.5 D; 315/169 TV; 340/324 M, 173 LS

[56] References Cited

UNITED STATES PATENTS

| | | | |
|---|---|---|---|
| 3,021,387 | 2/1962 | Rajchman | 178/7.3 D |
| 3,576,394 | 4/1971 | Lee | 178/7.3 D |
| 3,740,570 | 6/1973 | Kaelin et al. | 178/7.3 D |
| 3,742,483 | 6/1973 | Ogle | 178/7.3 D |
| 3,761,617 | 9/1973 | Tsuchiya et al. | 178/7.3 D |
| 3,838,209 | 9/1974 | Tsuchiya et al. | 178/7.3 D |
| 3,863,023 | 1/1975 | Schmersal et al. | 340/324 M |

*Primary Examiner*—Robert L. Richardson
*Attorney, Agent, or Firm*—Irving M. Kriegsman; Leslie J. Hart

[57] ABSTRACT

A television display system is described in which a full resolution, interlaced scanned display of real-time images is provided on a bistable matrix display panel. The display system has a gray scale with 64 discrete levels of brightness. The brightness levels are achieved with each panel cell turning on for one of 63 different accumulative intervals of time in response to digitized TV signals. From zero to six separate pulses of light are produced from each cell. The durations of these pulses form a geometric progression such that each of the sixty-four possible combinations of pulses has a distinct cumulative time interval. The analog TV signal is converted to a 6-bit digital word for each cell of the display panel. A memory and control system are provided for storage of the words. The least significant bit of the digitized TV signal controls the shortest pulse for the particular cell, and the most significant bit controls the longest pulse. Each bit of the digitized TV signal controls a pulse twice as long as the one controlled by the previous bit. By controlling the shortest duration pulses of the cell first and the longest duration pulses last, the data memory requires no more than one storage location per cell for the six bits of the signal.

13 Claims, 14 Drawing Figures

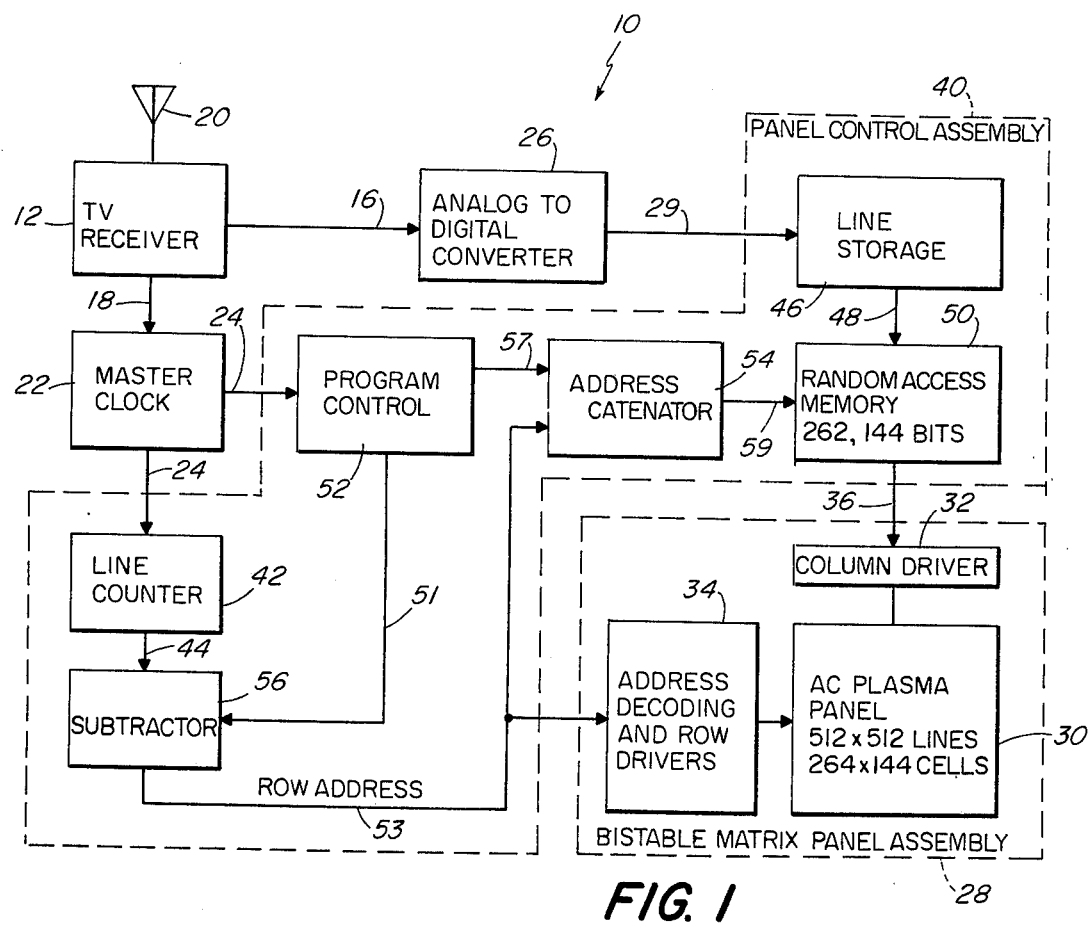
FIG. 1
FIG. 2a
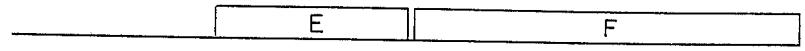
FIG. 2b
FIG. 2c
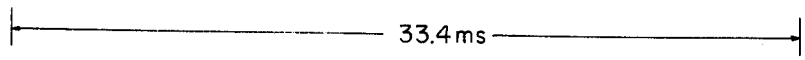

BISTABLE MATRIX TELEVISION DISPLAY SYSTEM

BACKGROUND OF THE INVENTION

The present invention relates to flat panel television displays.

Since the early days of television, researchers have sought for a "picture on the wall" as an alternative to both television picture tubes and TV projectors. Presumably, the ideal embodiment would be a thin television set, either large or small, with the appearance of a painting in a frame but showing television pictures in full color.

It was recognized from the outset that to replace the scanning electron beam of the picture tube as a means for gaining separate access to the elements of the picture, separate electrical connections to all of the picture elements are necessary. The display panel must thus be divided into a matrix of discrete display elements, and connections must be made to each of these elements. As used herein, a bistable element is one in which the element has both a stable "on" and a stable "off" condition; one bistable element is an AC plasma element including a sealed envelope containing a suitable gas fill material and a pair of electrodes which are insulated from the gas fill. In certain cases, a DC plasma element may operate in a bistable manner.

In recent years several matrix panel display systems have been developed. One system is described in the publication "A Field-Interlaced Real-Time Gas-Discharge Flat Panel Display with Gray Scale", 1972 IEEE Conference on Display Devices Conference Record, New York City, October 11-12, 1972, pp. 70-75, by Y. S. Chen and H. Fukui. Another system is described in the publication "Good Quality TV Pictures Using a Gas-Discharge Panel," 1972 IEEE Conference on Display Devices Conference Record, New York City, October 11-12, 1972, pp. 77-82, by G. J. Chodil, M. C. DeJule, and J. Markin.

These two publications describe TV displays using DC plasma panels which are made by Burroughs Corporation and known by the trademark Self-Scan in which pictures are generated a TV line at a time with pulses of light emitted for about 50 microseconds for a standard TV display, 30 times/sec, thereby giving a duty factor of 0.0015. As used herein duty factor is defined as the ratio of the time in which a cell emits light during one picture frame to the time period for one picture frame.

Another system is described in the publication "Picture Display with Gray Scale in the Plasma Panel," 1973 SID International symposium Conference Record, New York City, May 15-17, 1973, pp. 70-71 by S. Umeda, K. Murase, H. Ishizaki and K. Jurahashi. A fourth system is described in the publication "Plasma Display with Gray Scale, " 1973 SID International Symposium Conference Record, New York City, May 15-17, 1973, pp. 72-73 by K. Jurahashi, H. Tottori, F. Isogai and N. Tsuruta. The third and fourth publications describe TV displays using AC plasma panels, which are similar to those manufactured by Owens-Illinois Company, in which pictures are generated with pulses of light lasting considerably more than a single TV line period through use of the inherent image storage capabilities of the AC plasma panel. In the third publication, some measure of gray scale is achieved through the use of a group of four cells to form each resolution element of the display. These cells supply one, two, four and eight units of brightness, respectively and are operated in the digitized slow-scan TV like signals. In the fourth publication, gray scale is achieved with each cell turned on for four different intervals of time, these intervals being of one, two, four and four times a unit duration, the unit being large enough to provide a high duty factor.

The methods which have been used for line-at-a-time matrix TV display, such as described in the first and second publications, impose a low duty factor on the display, requiring that the instantaneous brightness be orders of magnitude greater than the average brightness level perceived by the viewer.

The two methods previously used with AC plasma panels, such as those described in the third and fourth publications, provide greatly increased duty factor through the use of inherent storage capabilities in the panel (i.e., bistable operation of each cell), but this advantage is accomplished at a serious loss in the number of gray scale levels in both systems. In addition, there is loss of picture resolution in the third system because four, separate cells form each resolution element. In the fourth system, there is considerable flicker of the picture and reduction by half in the vertical resolution.

SUMMARY OF THE INVENTION

It is an object of the invention to provide a TV matrix panel display having a significant increase in display duty factor over the "line-at-a-time" matrix TV display, thereby, yielding corresponding increases in brightness.

It is another object to provide this increase in duty factor without the loss of resolution or contrast, as has occurred with the known high-duty-factor displays which use bistable display panels.

It is still another object to provide a system having substantially a 100% duty factor.

It is additionally an object to provide a system having reduced flicker.

It is still an additional object to provide a TV display system having 64 discrete levels of intensity and having a full resolution, interlaced display with a data memory storage no greater than the total number of cells in the display.

According to the present invention, a television display system of the type having a source of a baseband analog video signal includes an analog-to-digital converter generating in response to the video signal an N bit digital word which is a function of the signal amplitude for each picture element. The system further has a bistable matrix panel display of the type in which each cell turns on in response to half select write pulses to corresponding row and column electrodes and turns off in response to a full select erase pulse on the corresponding row electrode. According to the invention, a control assembly receives the digital words and generates the write and erase select pulses for the display panel. Each cell is turned on for up to N different durations, the durations being a geometric progression of the magnitude of the N bit word to produce a display having $2^N$ discrete levels of intensity.

In a preferred embodiment, each digital word has six bits to represent up to sixty-four discrete levels of intensity. The control assembly includes apparatus for controlling the production of six light pulses for each panel cell. Each bit of the digital word controls the presence or absence of one of the six pulses, designated A through F, where A corresponds to the least significant bit and F to the most significant bit. In accordance with one feature, the control assembly causes the generation of light pulse A, (the shortest) first and light pulse F (the longest) last. The digital bits used to control these pulses are stored in an optimum memory configuration whose bit storage capability need be no greater than the total number of cells in the display.

BRIEF DESCRIPTION OF THE DRAWINGS

In the Drawings:

FIG. 1 is a block diagram of the television display system according to the present invention;

FIGS. 2A through 2C illustrate examples of light pulse durations for three of the sixty-four possible discrete levels of intensity;

DESCRIPTION OF PREFERRED EMBODIMENTS

Figure 3:
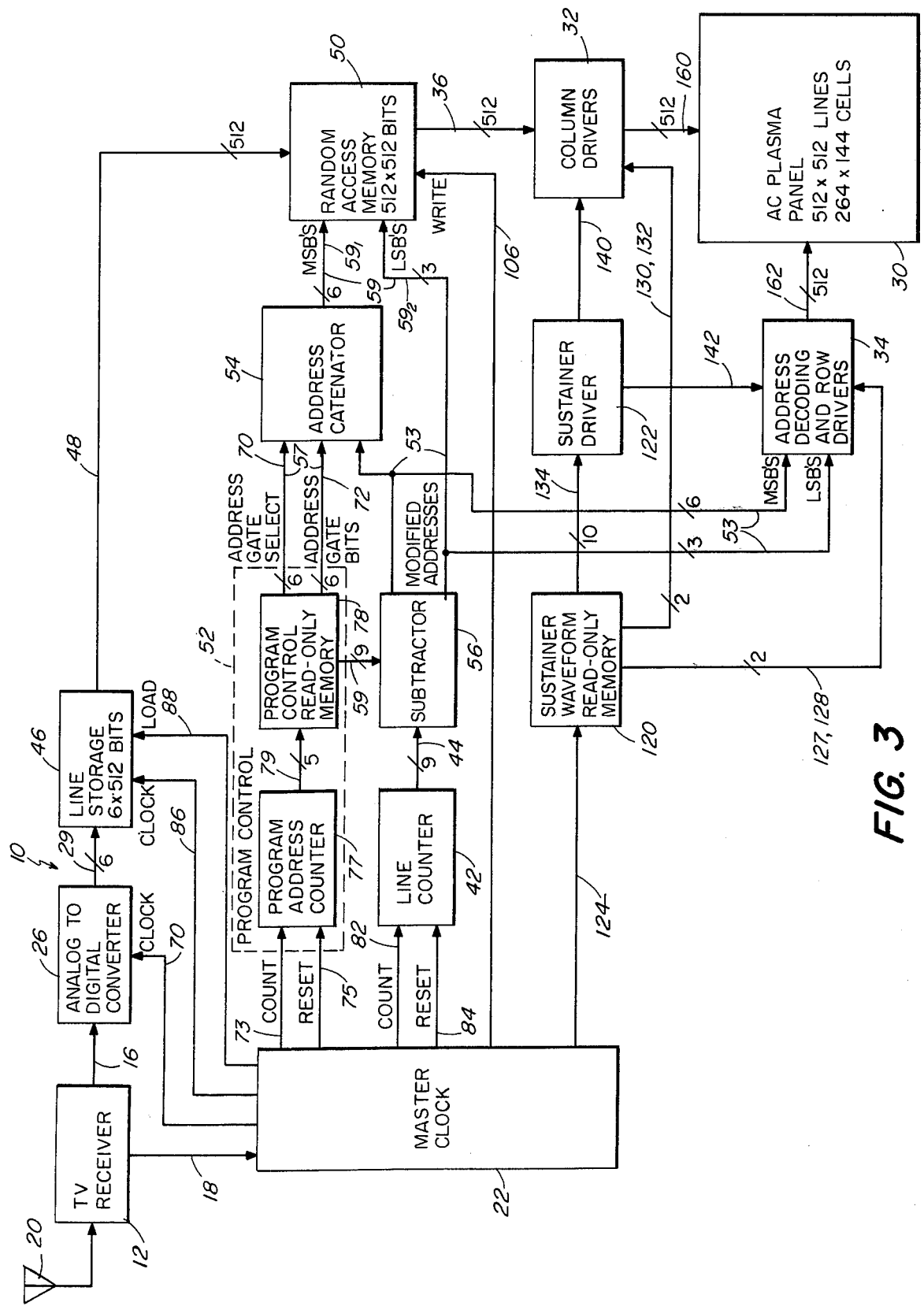
FIG. 3 is a more detailed block diagram of the display system indicating in more detail the various blocks in FIG. 1 and the number of data lines which interconnect the blocks.

In an exemplary embodiment of the present invention, as illustrated in FIG. 1, there is provided a block diagram of a flat panel television display system, represented generally by the reference numeral 10. The system 10 is of the type having a source of a baseband analog video signal. The source may include a conventional television receiver 12 less the picture tube and its associated drive circuitry, the receiver responding to transmitted television information and producing a baseband analog video signal on line 16 and a video synchronization signal on line 18. For off-the-air reception, the receiver 12 is connected to an antenna 20. A master clock 22 responds to the synchronization signal 18 and produces timing control signals 24 so that the system 10 displays synchronized television information on a real-time basis. An analog-to-digital converter 26 receives the analog video signal 16 and in response thereto, for each picture element of the video signal during each line scan, generates an N-bit digital word on output line 29. In the preferred embodiment N is equal to six, and the bits are designated A through F, bit A being the least significant bit and bit F being the most significant bit. The display system 10 may also be implemented with N being 5 and still provide an adequate gray scale. The system 10 also includes a bistable matrix panel assembly 28 for displaying the video information on a real-time basis. In the preferred embodiment, the bistable panel assembly 28 is an AC plasma panel 28 but it should be understood that the invention contemplates any bistable matrix panel, such as a bistable DC plasma panel, or a matrix panel other than a plasma panel. The panel 30 has 512 row electrodes, 512 column electrodes and 264,144 cells operatively associated with the electrodes; this panel arrangement was chosen primarily because of the availability of such a panel. A more ideal panel would be the arrangement of 480 (row) × 640 (column) electrodes and 307,200 cells. A column driver assembly 32 receives digital inputs and creates the signals for the column electrodes which are necessary to produce excitation of the cells. An address decoding and row driver assembly 34 receives digital information representing the particular one of the rows of cells to be excited or erased and generates the proper signal for that row electrode.

The display system 10, according to the invention, further includes a panel control assembly 40 which, in response to the timing control signals 24 and the N-bit digital words 29, generates a column control signal 36 and a row address control signal 38, these signals, plus a sustainer signal to be described subsequently, controlling the panel 28 such as to produce a full-resolution, interlaced television display. A line counter 42 receives the timing control signal 24 and generates a line count signal 44 which at any time represents the particular line out of 525 that is being presented to the analog-to-digital converter 26. The counter may be a 9 stage counter since no more than 512 or $2^9$ video information containing lines are actually transmitted. There are 525 lines in a standard television frame with about 480 having picture information and only 512 lines on the panel. The difference is compensated for by stopping the panel operation for 13 line scan periods each TV frame during vertical retrace, 6 lines after the first field and 7 lines after the second field. The line counter 42 is reset by a timing signal created by the vertical sync pulse; the counter input signal is a timing signal created by the horizontal sync pulse. A line storage register 46 stores all digital bits for each line and then transfers the digital line data via output line 48 to a storage memory device, such as a random access memory 50. Preferably, the line storage device 46 includes 512 × 6 or 3072 shift register stages, thereby storing during each line scan interval all data bits for a single TV line. Control over the use of the digital data being written into the memory 50 is provided by a program control assembly 52, an address catenator 54 and a subtractor 56. This panel control assembly 40 uses a random access memory (RAM) for data storage and read only memory (ROM) for program control. Different ROM's may be used to provide a variety of operating modes with different duty factors and panel write/erase sequences.

The basic operation of the system 10 is described as follows. Gray scale is achieved by varying the "on" time duration of the individual display cells. The cells operate at a fixed intensity when they are on and the human eye integrates the light output and perceives the average intensity. The "on" time of the cells is varied by using combinations of six pulses whose time periods form a binary progression as shown in FIG. 2. The six pulses are separately controlled by the corresponding digits of the digitized TV signal; light pulse A, the shortest pulse, is controlled by the least significant digit, and light pulse F, the longest, is controlled by the most significant digit of the data word.

By using a relationship between the six pulse widths that are the same as the amplitude relationships of the six digits in the analog-to-digital converter, it is possible to make a linear conversion of the video amplitude to light output. FIG. 2a shows the pulse sequence at maximum brightness. All six of the pulses, A through F, are present. FIG. 2b shows the pulse sequence for 75 percent brightness. Only two pulses are present, the E (25%) and the F (50%) pulse. FIG. 2c shows the pulse sequence for 52 percent brightness. Only two pulses are present, the A (2%) and the F (50%) pulse. As used herein "%" refers to % of maximum brightness. "A" is actually only 1.5625%, not 2%. The 2% is a rounded value; therefore, FIG. 2c actually shows 51.5625% of maximum brightness.

The sequences shown in FIG. 2 were chosen to show the fixed timing of the pulses relative to the starting time of the sequence. The pulse durations are given in TV line scan periods, (i.e., multiples of 63.5 microseconds). Thus, for example, pulse A is "on" for 8 line scan periods and pulse F is "on" for 256 line scan periods.

The total on-time at maximum brightness, as shown in FIG. 2a, is 504 line scan periods. This is the maximum value that can be achieved with whole line scan periods and still maintain a binary relationship between the six pulses. The display duty factor in this case is 504/525 = 0.96 which is substantially equal to a duty factor of 100%.

The interlacing is achieved by defining alternative rows, from top to bottom, to be rows 0 to 255 and the interleaving rows to be 256 to 511. The panel rows are addressed 0 to 511 to correspond to the incoming data during a television frame.

The panel works on a half-select principle. An AC sustainer signal is applied between all row electrodes and all column electrodes. The magnitude of this signal is large enough to sustain a discharge after it is initiated but not large enough to initiate a discharge by itself. Cells are turned on and off through application of superimposed control pulses to the corresponding row and column electrodes. To turn on a particular cell both its row and column electrodes must be pulsed simultaneously. In operation, a given row, as determined by the ROW ADDRESS, is pulsed and at the same time the proper data word is read from memory. The data word bits cause the column drivers to simultaneously pulse the column in which a cell is to be lighted. Once a cell is lighted it remains on, due to the bistable nature of the AC plasma panel, until it is erased. Since the panel is erased a line at a time, it is not necessary to use a half select pulse to erase. A row is given a full amplitude erase pulse. The cells that were on are erased, and the cells that were off are unaffected. During erase intervals the column drivers are not pulsed.

The panel is driven with a sustainer signal that accommodates two turn-on (or write) events during one half and two turn-off (erase) events during the opposite half cycle of the sustainer waveform. Three sustainer cycles are produced during each line scan period with a pause during horizontal retrace for transfer of data to the RAM. Thus, six write and erase operations can be performed each line scan period. Thus, six different light pulses may be generated per cell, per TV frame to produce a display with 64 different intensity levels.

Each row of the panel is addressed twelve times each television frame period, once for each write and erase pulse. The addressing is accomplished by subdividing each line scan period into thirteen time intervals. One interval is used for transfer of the data in the line storage shift registers to the main memory; six intervals are used for writing the panel and six are used to erase the panel. During each of these intervals a fixed digital number on line 51 is read from the program control read-only memory 78 and subtracted from the present line count on line 44 to generate the address on line 53 of the row to be written or erased. During write intervals the program control 52 also generates the proper data bit code word at 57 to be catenated with the row address 53 to produce an address at 59 which causes the read out of the proper data word at 36 from the memory 50. Thus, if one were to look at the ROW ADDRESS during the thirteen intervals for each line scan period, the row address 53 is the present line count during the data transfer interval and different constant values less than the present line count for the write and erase intervals for the six pulses A through F. The actual numbers from the program control depend on the programmed duty cycle and read/write sequence. A typical program is shown in Table 1 below. The number that would be stored in program control and read out in sequence each line scan period to implement this program would be, in decimal form, 0, 255, 28, 125, 26, 61, 10, 254, 9, 126, 1, 510 and 59.

TABLE I

1. Transfer data to RAM
2. Write F pulse of line $n$-255
3. Write C pulse of line $n$-28
4. Erase D pulse of line $n$-125
5. Erase B pulse of line $n$-26
6. Write D pulse of line $n$-61
7. Write B pulse of line $n$-10
8. Erase E pulse of line $n$-254
9. Erase A pulse of line $n$-9
10. Write E pulse of line $n$-126
11. Write A pulse of line $n$-1
12. Erase F pulse of line $n$-510
13. Erase C pulse of line $n$-59

Where $n$ is the present line count.

Figure 4:
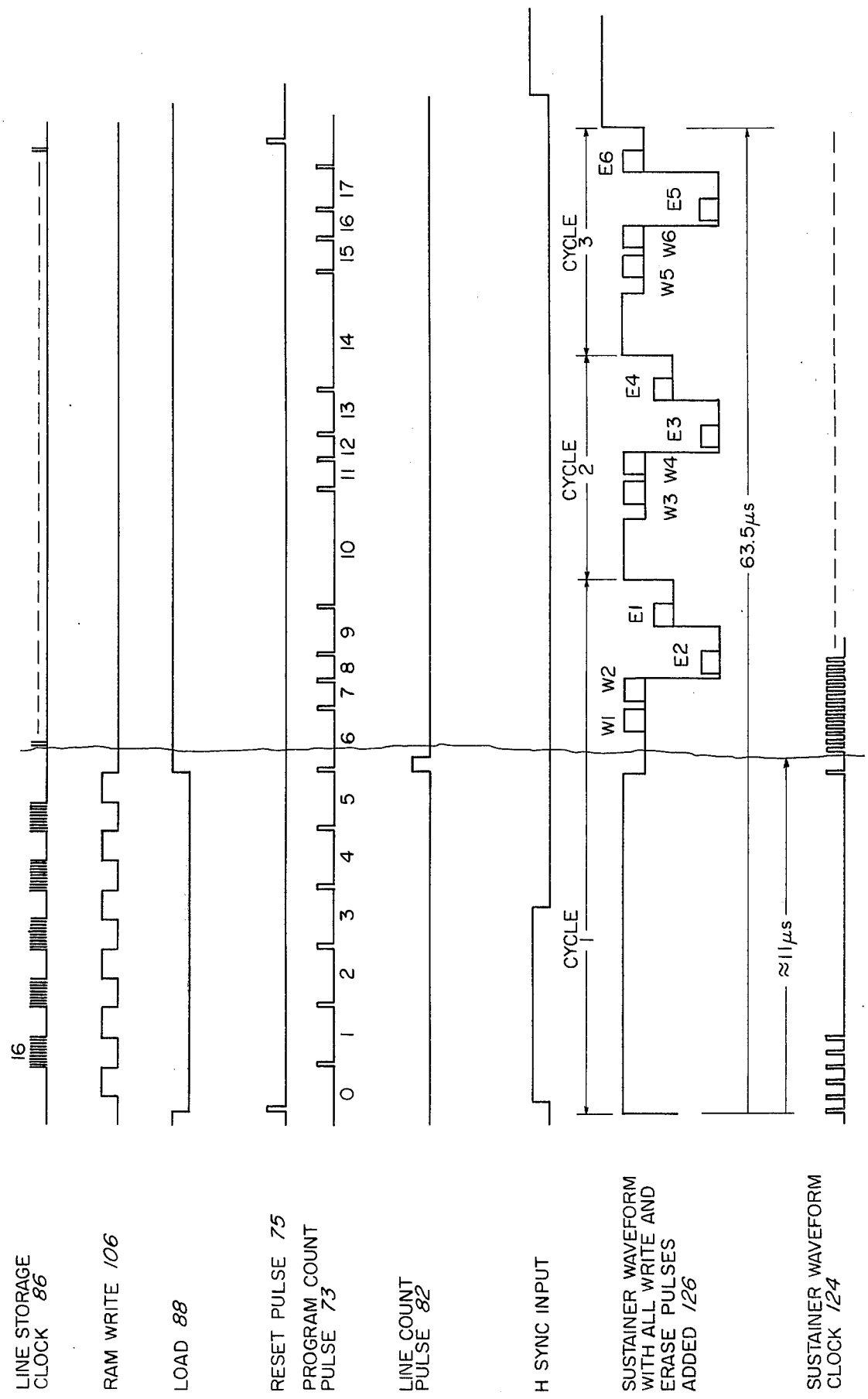
FIG. 4 is a series of timing waveforms illustrating the various clock signals from the master clock shown in FIGS. 1 and 3.

The memory 50 consists of 512 integrated circuits (one IC for each column electrode). The total memory capacity of 262,144 bits is organized into 512 line words of 512 bits each. The data is written into the memory one line word (512 bits) at a time from the parallel output of the line storage register. As used herein a line word is for example, 512 F bits for the 512 picture elements of a line scan period. The N bit digital word comprises the pulses A through F for any one of the 512 picture elements. The time required to transfer the data from the line storage 46 to the main memory 50 is about twelve microseconds as shown in FIG. 4. Six, one microsecond intervals are used in shifting the data to the parallel output of the line storage 46, as shown in the line storage clock waveform, and six, one microsecond intervals are used to write the six words into the memory 50, as shown by the RAM write waveform.

The amount of memory required is a function of the operating sequence, duty factor, and number of gray scales. There are six data bits per cell per frame, for a total of 1,584,864 bits. Thus, 1,584,864 memory storage locations are required to store an entire television frame of six bits per cell. However, once a data bit is used in this system for purposes of writing, it is no longer needed for any purpose and its storage location may be reallocated to another data bit. By using each memory location element a maximum allowable number of times per frame, it is possible to reduce storage requirements by a factor of six (to 264,144 elements) and still have nearly a 100% display duty factor.

The line words (i.e., 512 F pulses, 512 E pulses, etc) are read out of memory a fixed number of line scan periods after they are placed into memory. The minimum number of line word storage locations required for each of the line words A through F is equal to the number of line scan periods between its receipt and its use. For the program shown in Table 1 the requirement is 1 A line word, 10 B line words, 27 C line words, 61 D line words, 126 E line words, and 255 F line words. The total memory required is 480 words for the above example. With the display sequence arranged so that the shortest pulse occurs first and the longest last as in FIG. 2, the memory requirements are minimized.

The RAM address is formed by the catenation or linking of a data bit code word and several bits from the ROW ADDRESS. Table 2 below and Table 3 show the addressing used at the maximum duty factor.

TABLE 2

| | |
|---|---|
| 000 001 XXX  8 A words | 001 XXX XXX  64 D words |
| 000 01X XXX  16 B words | 01X XXX XXX  128 E words |
| 000 1XX XXX  32 C words | 1XX XXX XXX  256 F words |

During the memory write cycle, the system is programmed to make the ROW ADDRESS 53 equal to the present line count (i.e., by subtracting zero from the line count). This causes each line word to be stored at a location in the memory 50 determined by its row address 53 and a data bit code word comprising an address gate select word 70 and an address gate bits word 72. The number of row address bits and code word bits must equal nine (nine address bits to address 512 words). The number of row address bits must be sufficient to address all of the memory locations allocated to a given data bit. For the memory allocation shown in Table 2 three row address bits are needed for the eight A words, and eight row address bits are needed for the 256 F words. The address bits are designated by the X's and the code words by the ones and zeros. Each x is a one or a zero, depending upon the row address at 53. The number of storage spaces allocated to each of the data words, as shown in Table 2 is larger than the minimum in order to simplify the addressing.

Referring again to FIG. 3, the block diagram shown therein is more detailed than that shown in FIG. 1. More specifically, the program control 52 in FIG. 1 includes a program address counter 77 and a program control read only memory 78. The counter 77 is a five stage counter (i.e., 32 possible counts) that is adapted to count the program count pulse 73 which is derived from the master clock 22 and shown in FIG. 4. The counter 77 is reset by a reset pulse 75 from the master clock 22, the pulse 75 as shown in FIG. 4 occurring every 63.5 microseconds. The output of the counter 77 is a five bit word on the lines represented at 79 which are directed to the read only memory 78. Table 3 shows the various program words which are stored in the memory 78; by providing the program control 52 with a read only memory, the system has greater versatility in the selection of duty factor and the number of gray scale levels. It should be understood, however, that the program control 52 could be hard wired to produce only the required words in response to the 5 bit counter output.

Table 3 illustrates the value of the data words stored in the ROM memory 78 and the sequence at which the various words are transferred out of the memory. The Y's denote "don't care" bits, which can be arbitrarily set to one or zero without affecting the operation. In the preferred embodiment they are set equal to zero. The ROM 78 transfers eigthteen, nine bit words to the subtractor 56, each being transferred at the program control address or count 79 indicated in Table 3 decimal form. These words at 51 in

TABLE 3

| Program Control Address (79) in Decimal Form | Address to Subtractor (51) Binary MSB ... LSB | Decimal | Data Bit Code Word | | PROGRAM |
|---|---|---|---|---|---|
| | | | Address Gate Select Bits (70) MSB ... LSB | Address Gate Bits 72 MSB ... LSB | |
| 0 | 000000000 | 0 F | 100000 | 1YYYYY | transfer F line word to RAM |
| 1 | 000000000 | 0 E | 110000 | 01YYYY | transfer E line word to RAM |
| 2 | 000000000 | 0 D | 111000 | 001YYY | transfer D line word to RAM |
| 3 | 000000000 | 0 C | 111100 | 0001YY | transfer C line word to RAM |
| 4 | 000000000 | 0 B | 111110 | 00001Y | transfer B line word to RAM |
| 5 | 000000000 | 0 A | 111111 | 000001 | transfer A line word to RAM |
| 6 | 011111111 | 255 | 100000 | 1YYYYY | write F line word of line n-255 |
| 7 | 000011100 | 28 | 111100 | 0001YY | write C line word of line n-28 |
| 8 | 001111101 | 125 | YYYYYY | YYYYYY | erase D line word of line n-125 |
| 9 | 000011010 | 26 | YYYYYY | YYYYYY | erase B line word of line n-26 |
| 10 | 000111101 | 61 | 111000 | 001YYY | write D line word of line n-61 |
| 11 | 000001010 | 10 | 111110 | 00001Y | write B line word of line n-10 |
| 12 | 011111110 | 254 | YYYYYY | YYYYYY | erase E line word of line n-254 |
| 13 | 000001001 | 9 | YYYYYY | YYYYYY | erase A line word of line n-9 |
| 14 | 001111110 | 126 | 110000 | 01YYYY | write E line word of line n-126 |
| 15 | 000000001 | 1 | 111111 | 000001 | write A line word of line n-1 |
| 16 | 111111110 | 510 | YYYYYY | YYYYYY | erase F line word of line n-510 |
| 17 | 000111011 | 59 | YYYYYY | YYYYYY | erase C line word of line n-59 |

FIGS. 1 and 3 correspond to the decimal values shown in the third column from the left in Table 3. The memory 78 also stores eighteen address gate select words 70 and address gate words 72 each being a six bit word. The details of the logic within the memory 78 for performing the functions shown in Table 3 are not shown.

The details, however, are not a part of the present invention and are within the skill of those skilled in the art.

The line counter 42 is a nine stage counter which counts a line count pulse 82 from the master clock 22 and resets with the reset pulse 84. The counter output 44 is a nine bit count defining a line count from 0 to 511. The reset pulse 84 occurs after the two fields which occur during one complete TV frame period. The details of the line counter and the master clock 22 are not shown since they are within the skill of those skilled in the art. The master clock 22 also provides clock pulses 70 to the converter 26 having a frequency corresponding to the frequency of picture elements, a line storage clock pulse train 86 shown in FIG. 4, and a load pulse 88, shown in FIG. 4, the latter two pulse signals being directed to the line storage 46.

Figure 5:
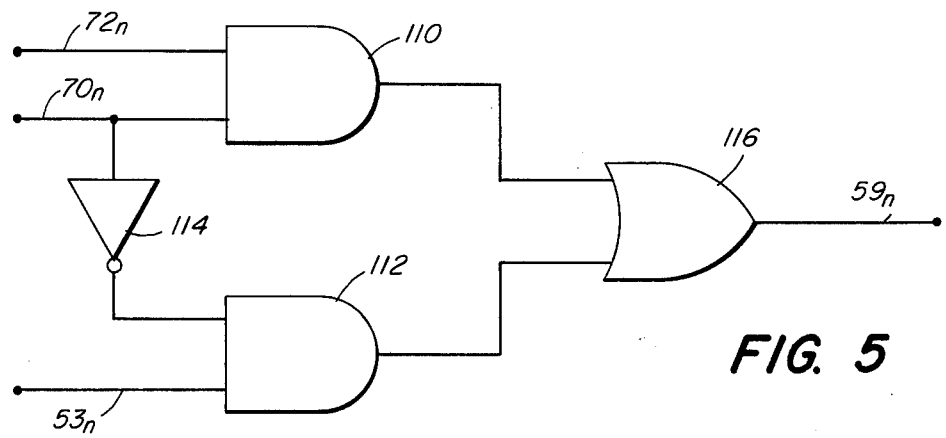
FIG. 5 is a logic circuit of a portion of the catenator illustrated in FIGS. 1 and 3.
Figure 6:
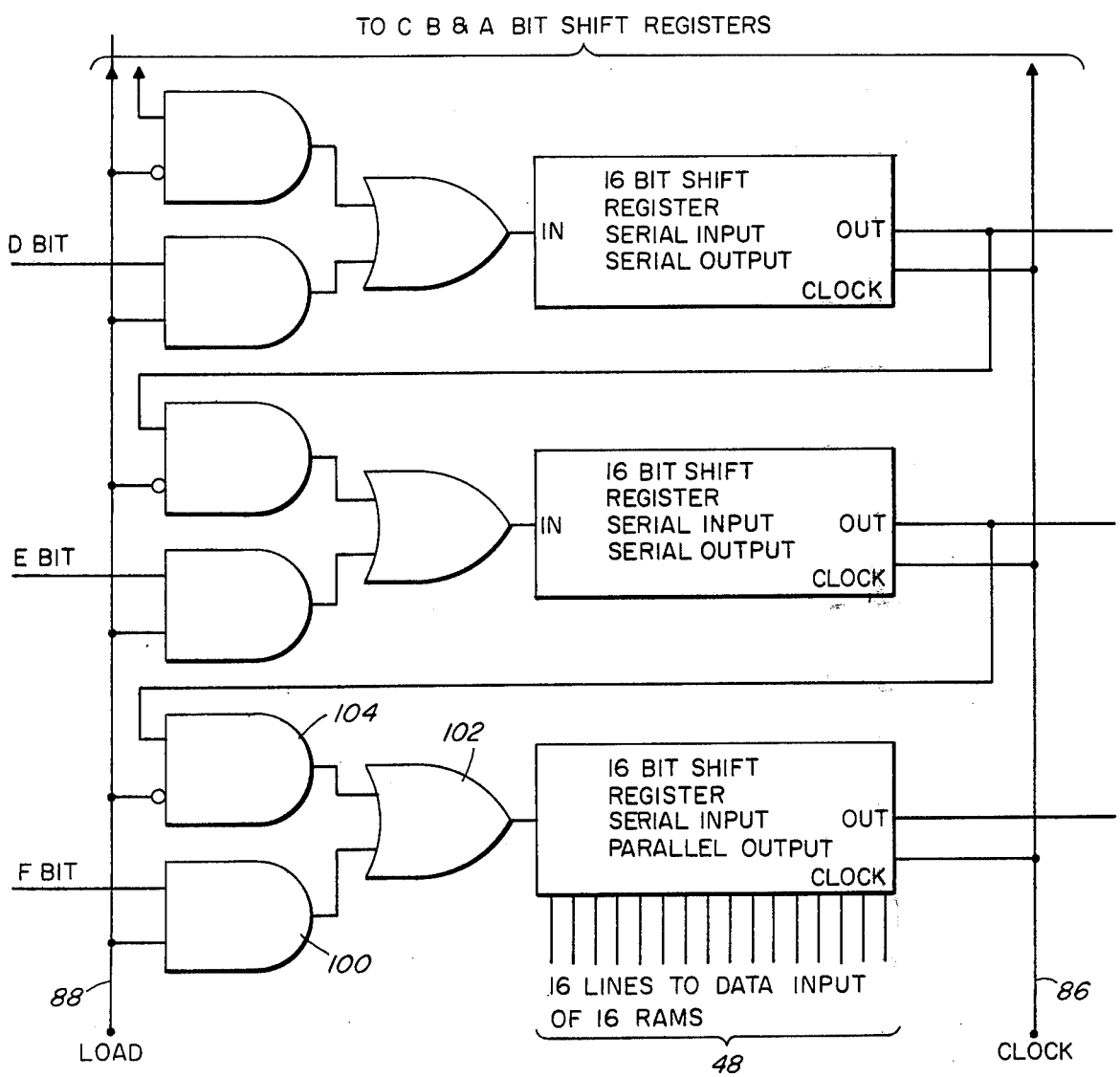
FIG. 6 is a logic circuit of a portion of the line storage block shown in the block diagrams of FIGS. 1 and 3.
Figure 7:
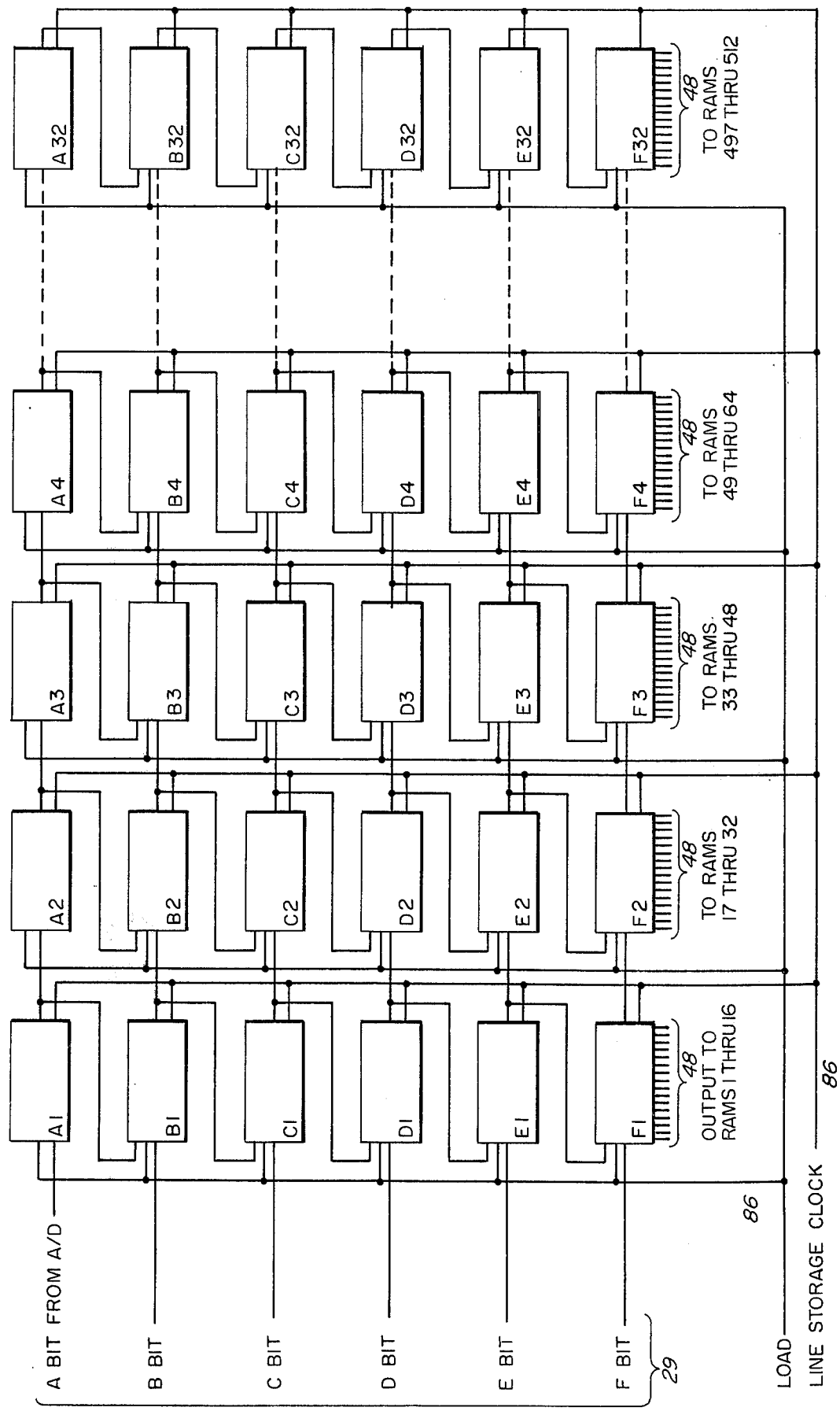
FIG. 7 is a detailed block diagram of the entire line storage, shown in the block diagrams of FIGS. 1 and 3.

Referring now to FIGS. 6 and 7, there is produced information regarding the detailed operation of the line storage 46. The line storage 46 comprises 32, 16 stage registers for each of the 6 bit words for each picture element in a line scan period; these registers are designated A, to A 32, B, to B 32, etc. Each register except for those designated F, to F 32 are serial input-serial output devices; the F registers are serial input and both serial and parallel output devices. FIG. 6 shows the detailed input logic to the registers of the D, E, F register set; the input logic for the A, B and C registers is identical to that of the D and E registers. During a line scan period, the 6 bits for each of the 512 data words at 29 are stored in the line storage. During transfer of data to the RAM 50, the load pulse 88 goes to a logic "0", and the clock 86 is stopped. The proper RAM address 59 for an F data line word is established, and the F data line word is written into the RAM 50 by a RAM write pulse 106. The clock 86 is then pulsed sixteen times to transfer the sixteen E bits into the F bit register via AND gate 104 and OR gate 102. Also, the same sixteen clock pulses transfer the A bits into the B register, the B bits into the C register, the C bits into the D register, and the D bits into the E register. Furthermore, during this sixteen clock pulse interval, the proper address 59 for an E data line word is established. After the sixteenth clock pulse, the RAM write pulse 106 causes the E data line word, now in the F register, to be written into the RAM. This sequence of sixteen clock pulses and a RAM write pulse is repeated four more times to write the D, C, B and A data line word into the RAM. Referring now to FIG. 5, there is illustrated the partial logic for the catenator 54; this logic is duplicated for the other five bits which are inputed to the catenator. The logic comprises AND gates 110 and 112, inverter 114 and OR gate 116. The operation may be perhaps best described with reference to Table 3. When the address gate select bit 70 from the ROM is a logic "1", the gate 110 controls the output 59 to the RAM; thus, the output is whatever the address gate bit happens to be. When the address gate select bit 70 is a logic 0, the output 59 to RAM is whatever the modified address bit 53 happens to be.

For example, assume program step 2 (transfer D to RAM) with modified address 53 from subtractor being 010111101.

|  | MSB | LSB |
|---|---|---|
| address gate select 70 | 111000 | |
| address gate bits 72 | 001000 | |
| modified address 53 to catenator | 010111 | |
| modified address bits 53 to RAM | | 101 |
| Total 9-bit address to RAM | 001111 | 101 |

The catenator has replaced the first three bits (010) of the modified address 53 with the first three address gate bits (001) of 57. The RAM memory 50 performs the following operation. When the MSB of the RAM address is a logic 1, as for writing or transferring an F line word, the word is stored in one of 256 defined word locations, the particular one of which is determined by the next eight bits of the nine line input $59_1$ and $59_2$. Secondly, when the first five bits are logic 0 and the sixth is a logic 1, of 59 (i.e., write or transfer an A line word), the word is stored in or transferred from the particular one of eight locations for the A line words, the particular one depending on the three bits of the input $59_2$ to the RAM 50.

The display panel uses an Owens-Illinois DIGIVUE Display/Memory unit, modified to provide full line-at-a-time writing and addressing. The 8.5 inch square panel has 512 columns and 512 rows with a resolution of 60 lines per inch and an area brightness of 20 fl.

Figure 8:
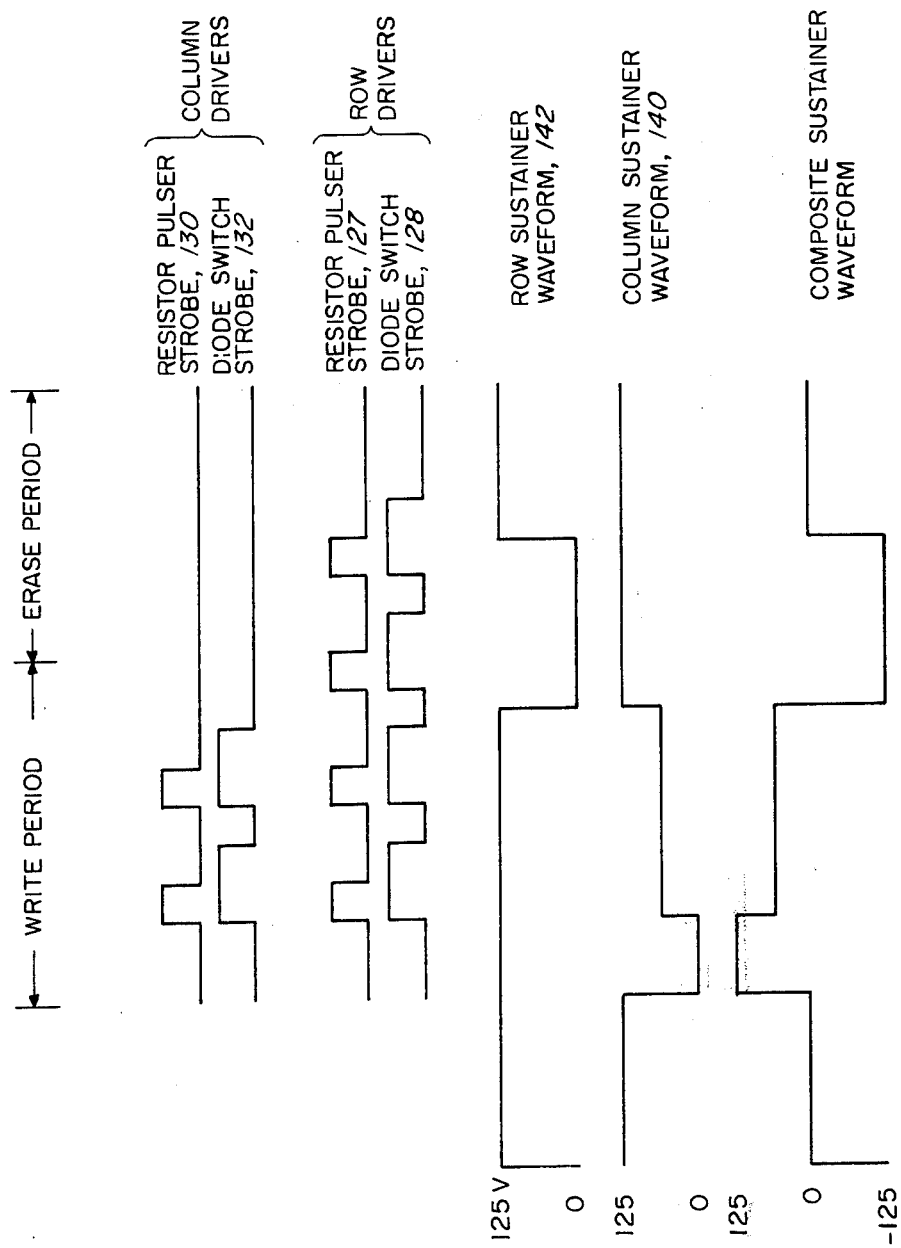
FIG. 8 illustrates the waveforms for the AC plasma panel.
Figure 9:
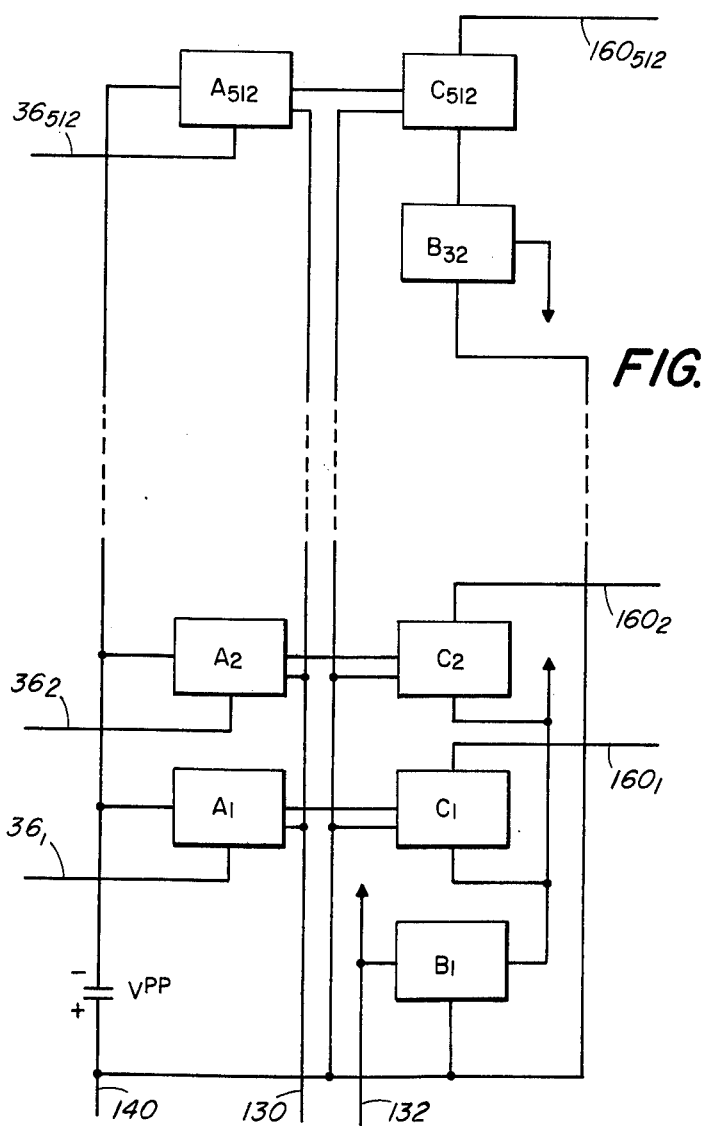
FIG. 9 is a detailed block diagram of the column drivers.

The description is now directed to the display panel control circuitry. This circuitry includes a sustainer waveform read-only memory 120 and a sustainer driver 122. The sustainer memory 120 receives a sustainer waveform clock 124 from the master clock 22, the clock waveform being shown on FIG. 4. This sustainer waveform is shown with all write and erase pulses added. The purpose of the sustainer waveform read-only memory is to generate, as shown in FIG. 8, the resistor pulser strobe 127 and diode switch strobe 128 for the row drivers 34, the resistor pulser strobe 130 and diode switch strobe 132 for the column drivers 32, and a 10 line code word 134 for the sustainer driver 122.

The basic clock which generates the sustainer waveform clock 124 in the master clock 22 has a frequency of 104 × 15.75 kHz or, stated differently, generates 104 pulses every TV line scan period. The sustainer waveform is divided into 3 cycles as shown in FIG. 4. The first cycle is longer than the other two but each cycle has only 32 clock pulses generated. Thus, there are 8 pulses 124 missing from the time for the first sustainer cycle.

Figure 12:
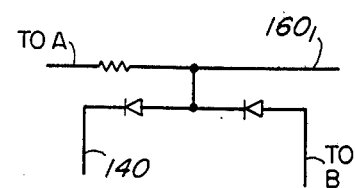
FIG. 12 is a schematic diagram of still another portion of the column drivers.
Figure 10:
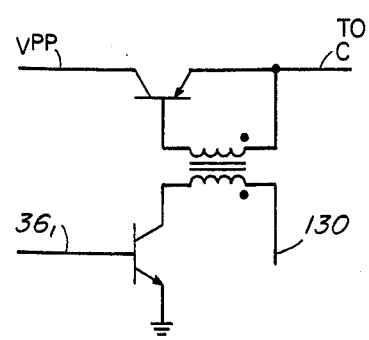
FIG. 10 is a schematic diagram of a portion of the column drivers.
Figure 11:
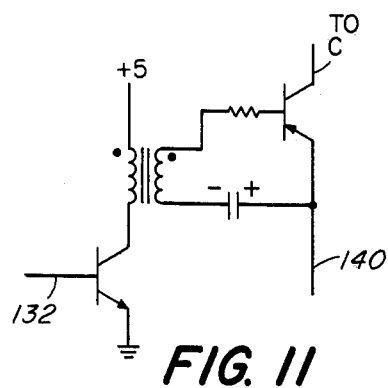
FIG. 11 is a schematic diagram of another portion of the column drivers.

The sustainer waveform read only memory 120 includes a five stage counter (not shown) that defines the particular one of the 32 pulses counted during each sustainer cycle. The counter output is applied to the memory which in turn transfers out two five bit words for generating the row and column sustainer waveforms 134. The sustainer driver has two circuits each of which receives a five line input; the sustainer driver generates a column sustainer waveform 140 and a row sustainer waveform 142, shown in FIG. 8. FIGS. 9 through 12 show the circuitry comprising the column drivers 32 of FIG. 3. There are 512 A circuits (FIG. 10), 32 B circuits (FIG. 11), one for every sixteen columns, and 512C circuits (FIG. 12). These designated circuits should not be confused with the data bits A through F. The address decoding and row drivers 34 include a decoder, not shown, which has logic for selecting the particular row to be addressed in response to the 9 bit modified address 53. The 9 bit address 53 is broken down into one, one bit word and two, four bit words. The two four bit words are used to drive two 16 × 16 resistor diode matrices, each of which selects one of 256 rows of electrodes. The one bit word is used to select one of the two matrices, thus selecting one of the 512 rows. Each of the matrices are driven by 16 diode drivers similar to the one shown in FIG. 11 and 16 resistor pulses similar to the one in FIG. 10. The resistor diode matrix is made up of 512 circuits similar to that shown in FIG. 12. The main differences between the row and column drivers are the change in polarity of $V_{PP}$, the change of the drive transistors from PNP's to NPN's, and the reversal of the diodes in the resistor diode matrix. Also, the sustainer waveform 140 in the Figures become the row sustainer waveform 142. For additional details regarding design and operation of the panel assembly 30, the sustainer driver 122, the column drivers 32 and the address decoding and row drivers 34, reference may be made to the publication entitled "A Quarter-Million-Element AC Plasma Display with Memory", Digest of Papers, 1971, SID International Symposium, Philadelphia May 4–6, 1971 by Johnson and Schmersal and the reference manual for the MDXVI DIGIVUE GASEOUS DISPLAY manufactured by Owens-Illinois Company, Perrysburg, Ohio. The major difference between this display and that described in the present invention is that this panel display has provisions for pulsing all 512 columns at once and is driven with a sustainer waveform that accommodates two turn-on (or write) events during one half cycle and two turn-off (erase) events during the opposite half cycle. Three sustainer cycles are produced during each line scan period with a pause during horizontal retrace for transfer of data to the RAM. Six write and erase operations can be performed each line scan period. Thus, six different light pulses may be generated per cell, per TV frame to produce a display with sixty-four different intensity levels.

As stated previously, the panel operation is stopped for 13 line scan periods (6 after the first field, 7 after the second field) during each 525 lines comprising a standard TV frame period. The primary advantage resides in optimization of commercially available hardware and in minimum complexity of circuitry. For example, by only processing 512 lines, (525 − 13), line tracking is obtainable with a conventional 9 stage counter. The stopping of the panel operation is accomplished in the master clock 22 which includes logic responding to the sync pulses for inhibiting the generation of the waveforms in FIG. 4 during the 13 line scan periods.

Another aspect of the present invention is a method of producing a television display. The method involves converting each picture element of the television analog video signal into an N bit digital word. Next, a sequence of signals which are controlled by the digital word is generated. The generation of the sequence includes dividing the signals into N separate parts so that the individual light pulse durations form a geometric progression related to the bit values of the digital word. Lastly, each cell of a bistable matrix display panel is energized by the sequence of signals so that the panel displays full-resolution, interlaced television information. Preferably, the energizing of the cells includes selecting the shortest of the separate durations first and the longest of the separate durations last. Furthermore, the method optimally includes making the maximum duration of the individual light pulse durations substantially equal to a full TV frame period to produce a display having a duty factor substantially equal to 100%. Where N is equal to 6 to provide 64 discrete intensity levels, the step of generating a sequence of signals involves performing the program steps 0 − 17 in Table 3, the steps starting with transferring F line word to memory and ending with erasing the C line word of line $n - 59$.

The embodiment of the present invention is intended to be merely exemplary and those skilled in the art shall be able to make numerous variations and modifications to it without departing from the spirit of the present invention. All such variations and modifications are intended to be within the scope of the present invention as defined in the appended claims.

We claim:

1. A television display system of the type having a source of a baseband analog video signal defining real-time frames each having a pair of interlaced fields, each field having a plurality of lines containing a plurality of picture elements,
  a. an analog-to-digital converter receiving the video signal and generating an N bit digital word representative of the intensity of the video signal for each picture element,
  b. a control assembly receiving each digital word and in response thereto generating a sequence of output light pulse control signals for each word, the cumulative light pulse duration in time being directly proportional to the intensity of the analog video signal for each picture element, the sequence of light pulse control signals being effective to provide a full resolution, interlaced TV display, the sequence of control signals being such that the control signal corresponding to the least significant bit of the digital word occurs first and such that the control signal corresponding to the most significant bit of the digital word occurs last, the control assembly having a storage memory for storing the N bits digital words and having a bit storage requirement no greater than the maximum number of display elements in the display panel, and
  c. a bistable matrix display panel receiving the sequence of signals to generate a full-resolution, interlaced display with a full range of gray levels displayed.

2. The display according to claim 1, wherein the control assembly includes means for producing a sequence of light pulse control signals for the control of a train of light pulses from each picture element with the time durations of the light pulses forming a geometric progression.

3. The display according to claim 1, wherein the N is equal to six to provide up to sixty-four discrete levels of intensity for each cell in the display panel.

4. The display according to claim 3, wherein the cumulative light pulse duration for maximum intensity is substantially equal to the duration of a TV frame period to provide a display having a duty factor substantially equal to 100%.

5. The display according to claim 3, wherein the display panel has 512 rows of cells, wherein the number of lines per frame received by the television display system is 525, and wherein the control system includes means for inhibiting the panel operation for 13 line scan periods each frame so that the line count requirement is equal to $2^9$.

6. The display system according to claim 5, wherein the panel operation is inhibited for 6 line scan periods after the first field and for 7 line scan periods after the second field.

7. A television display system of the type having a source of a baseband analog video signal defining real-time picture frames each having a pair of interlaced fields, each field having a plurality of lines containing a plurality of picture elements, including;
   a. an analog-to-digital converter sampling the video signal and generating an N-bit digital word representative of the amplitude of the video signal for each picture element,
   b. a bistable matrix display panel having an array of cells each of which is associated with one of a plurality of columns of electrodes and one of a plurality of rows of electrodes, each cell initiating the emission of light in response to half-select write pulses applied to the corresponding row and column electrode and all cells of a row terminating the emission of light in response to a full select erase pulse applied to the corresponding row of electrodes, and
   c. a control assembly receiving each digital word and in response thereto generating write and erase pulses, corresponding to the logic level of each of the N bits of the digital word, for the electrodes of the panel to initiate and terminate the emission of light from the cells, the cumulative duration of the light from each cell being a function of the magnitude of the video signal for each picture element so that a full resolution, interlaced television display is provided in which each cell of the panel can provide $2^N$ discrete levels of intensity, and the sequence of write and erase pulses being such that the duration of light corresponding to the least significant bit of the digital word occurs first and such that the duration of light corresponding to the most significant bit of the digital word occurs last.

8. A television display system of the type having a source of a baseband analog video signal defining real-time picture frames each having a pair of interlaced fields, each field having a plurality of lines containing a plurality of picture elements, including:
   a. an analog-to-digital converter sampling the video signal and generating an N-bit digital word representative of the amplitude of the video signal for each picture element,
   b. a bistable matrix display panel having an array of cells each of which is associated with one of a plurality of columns of electrodes and one of a plurality of rows of electrodes, each cell initiating the emission of light in response to half-select write pulses applied to the corresponding row and column electrode and all cells of a row terminating the emission of light in response to a full select erase pulse applied to the corresponding row of electrodes, and
   c. a control assembly receiving each digital word and in response thereto generating write and erase pulses, corresponding to the logic level of each of the N bits of the digital word, for the electrodes of the panel to initiate and terminate the emission of light from the cells, the cumulative duration of the pulses of light from each cell being a function of the magnitude of the video signal for each picture element so that a full resolution, interlaced television display is provided in which each cell of the panel can provide $2^N$ discrete levels of intensity, the shortest duration pluse of light corresponding to the least significant bit of the N bit word and occurring first and the longest duration pulse of light corresponding to the most significant bit of the N bit digital word and occurring last, the control assembly including:
      1. a clock means responsive to synchronization information in the baseband video signal for generating clock signals to synchronize the display system to the baseband video signal,
      2. a line storage device receiving the N bit digital words and storing the words, the storage device being adapted to transfer the digital words upon storage of all digital information for a TV line scan period,
      3. a random access memory receiving successive lines of digital information and storing the information, the memory having an output line corresponding to each column electrode and being adapted to transfer successive bits of the N bit word for each picture element in response to a preselected address command,
      4. a line counter responsive to the clock signals for providing an output defining the particular line of picture elements being converted into digital form,
      5. a program address counter responsive to the clock signals for providing an output defining a particular one of a plurality of predetermined program events occurring during each TV line scan period, and
      6. program control means responsive to the output of the program counter for generating address information to the random access memory to store digital information and for selecting and transferring selected ones of the N bit word for each line of picture element to the memory output lines and for generating row address information to select the respective row address for display.

9. The display system according to claim 8, wherein the program control means includes
   a. program control memory containing a plurality of row address words and a plurality of data bit code words for addressing the random access memory,
   b. a subtractor for generating a modified row address word by reducing the present line count outputs by a selected row address word from the control memory, and
   c. an address catenator receiving a selected address gate select word and an address gate word from the control memory and at least a portion of the modified row address from the subtractor to produce a memory address for the random access memory.

10. The display system according to claim 9, wherein the panel has 512 rows, 512 columns of electrodes and 264,144 cells and wherein N is equal to 6, the bits being designated A through F, the A bit being the least significant bit, the F bit being the most significant bit.

11. The display according to claim 10, wherein the durations of light corresponding to the bits A through F are 8, 16, 32, 64, 128 and 256 line scan periods, respectively.

12. The display system according to claim 11, wherein the program address counter counts eighteen program steps for each line scan period.

13. The display system according to claim 12, wherein the program control means in response to successive program steps transfers F, E, D, C, B and A line words to the random access memory, writes F line word of line n-255, writes C line word of line $n$-28, erases D line word of line $n$-61, writes B line word of line $n$-10, erases E line word of line $n$-254 erases A line word of line $n$-9, writes E line word of line $n$-126, writes A line word or line $n$-1, erases F line word of line $n$-510 and erases C line word of line $n$-59, where n equals the output of the line counter.

* * * * *